(12) United States Patent
Tashiro

(10) Patent No.: US 9,208,152 B2
(45) Date of Patent: Dec. 8, 2015

(54) DOCUMENT RETRIEVAL APPARATUS, DOCUMENT RETRIEVAL METHOD, AND COMPUTER READABLE MEDIUM

(71) Applicant: FUJI XEROX CO., LTD., Minato-ku, Tokyo (JP)

(72) Inventor: Kiyoshi Tashiro, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 144 days.

(21) Appl. No.: 13/748,876

(22) Filed: Jan. 24, 2013

(65) Prior Publication Data
US 2014/0067839 A1    Mar. 6, 2014

(30) Foreign Application Priority Data
Aug. 30, 2012    (JP) .................................. 2012-189773

(51) Int. Cl.
G06F 17/30    (2006.01)
(52) U.S. Cl.
CPC ................................ *G06F 17/30011* (2013.01)
(58) Field of Classification Search
None
See application file for complete search history.

(56) References Cited

U.S. PATENT DOCUMENTS

| 5,953,011 A | 9/1999 | Matsuoka |
| 2006/0242556 A1* | 10/2006 | Koshimizu et al. ........... 715/507 |
| 2012/0212421 A1* | 8/2012 | Honji ............................. 345/173 |

FOREIGN PATENT DOCUMENTS

JP    8-76955 A    3/1996

* cited by examiner

*Primary Examiner* — Son T Hoang
(74) *Attorney, Agent, or Firm* — Sughrue Mion, PLLC (57) ABSTRACT

A document retrieval apparatus includes a switching section that switches an operation mode between a first mode and a second mode, a processor, a storing section, and a retrieval section. In the first mode, when a document-related operation of a certain type is performed, the processor performs a process corresponding to the operation, and the storing section stores information indicating the operation and a document being a target or a result of the process into a memory so as to associate the information with the document. In the second mode, when the operation is performed, the retrieval section does not perform the process, and retrieves the document which was a target or a result of the process on the basis of data stored in the memory.

18 Claims, 6 Drawing Sheets

| OPERATION INFORMATION | ASSOCIATED DOCUMENT | EXECUTION TIME |
|---|---|---|
| DIVISION OPERATION | DOCUMENT A, DOCUMENT B | 1:01:01 |
| MERGE OPERATION | DOCUMENT C | 1:01:10 |
| OPERATION A | NONE | 1:01:13 |
| . . . | . . . | . . . |
| MOVING OPERATION | DOCUMENT D(FOLDER A) | 1:10:20 |

FIG. 10

| |
|---|
| DIVISION OPERATION |
| OPERATION A |
| MERGE OPERATION |
| MOVING OPERATION(FOLDER A) |
| MOVING OPERATION(FOLDER B) |
| OPERATION B |
| . . . |
| DIVISION OPERATION |

DOCUMENT RETRIEVAL APPARATUS, DOCUMENT RETRIEVAL METHOD, AND COMPUTER READABLE MEDIUM

CROSS-REFERENCE TO RELATED APPLICATIONS

This application is based on and claims priority under 35 USC 119 from Japanese Patent Application No. 2012-189773 filed Aug. 30, 2012.

BACKGROUND

1. Technical Field

The present invention relates to a document retrieval apparatus, a document retrieval method, and a computer-readable medium.

2. Summary

According to an aspect of the invention, there is provided a document retrieval apparatus including a switching section, a processor, a storing section, and a retrieval section. The switching section switches an operation mode between a first mode and a second mode. In the case where the operation mode is the first mode, when a document-related operation of either one of multiple types is performed, the processor performs a process corresponding to the performed document-related operation, and the storing section stores information and a document into a memory so as to associate the information with the document. The information indicates the performed document-related operation. The document is a target or a result of the process which corresponds to the document-related operation and which is performed by the processor. In the case where the operation mode is the second mode, when the document-related operation is performed, the retrieval section does not perform the process corresponding to the performed document-related operation, and retrieves the document which was a target or a result of the process which was performed when the operation mode was the first mode, on the basis of data stored in the memory.

BRIEF DESCRIPTION OF THE DRAWINGS

An exemplary embodiment of the present invention will be described in detail based on the following figures, wherein.

DETAILED DESCRIPTION

An exemplary embodiment of the present invention will be described in detail below on the basis of the drawings.

Figure 1:
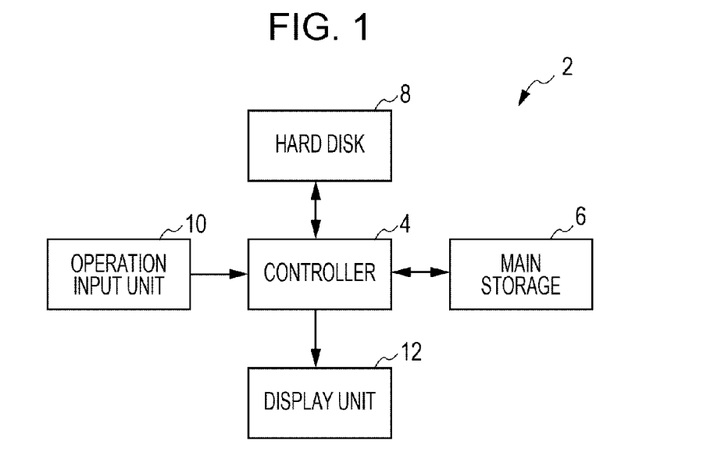
FIG. 1 is a diagram illustrating an exemplary configuration of a document management apparatus.

FIG. 1 is a diagram illustrating an exemplary configuration of a document management apparatus 2 according to an exemplary embodiment of the present invention. The document management apparatus 2 is a computer such as a personal computer, and includes a controller 4 as illustrated in FIG. 1. The controller 4 is a microprocessor, and performs processes according to document management application programs stored in a main storage 6. The document management apparatus 2 also includes the main storage 6 described above. The main storage 6 includes a random-access memory (RAM) and a read-only memory (ROM), and stores various data. Specifically, the main storage 6 stores the document management application programs as described above. In the present exemplary embodiment, the main storage 6 stores a flag indicating a current operation mode of the document management apparatus 2. In the operation mode, there are two types of modes, a normal mode (first mode) and a retrieval mode (second mode). The operation mode is switched between the normal mode and the retrieval mode. The document management application programs described above may be read out from a computer-readable information storage medium, e.g., a digital versatile disk read-only memory (DVD®-ROM), so as to be stored into the main storage 6, or may be downloaded via a network so as to be stored into the main storage 6.

The reason for the use of the operation mode will be described below.

The document management apparatus 2 also includes a hard disk 8. The hard disk 8 stores various types of information. In the present exemplary embodiment, the hard disk 8 stores documents. The documents are document data generated by the document management application programs. Other information stored in the hard disk 8 will be described below.

The document management apparatus 2 also includes an operation input unit 10. The operation input unit 10 is, for example, a mouse and a keyboard, and outputs an operation signal indicating an operation performed by a user, to the controller 4. The document management apparatus 2 also includes a display unit 12. The display unit 12 is, for example, a liquid crystal display, and displays information in accordance with an instruction of the controller 4.

Figure 2:
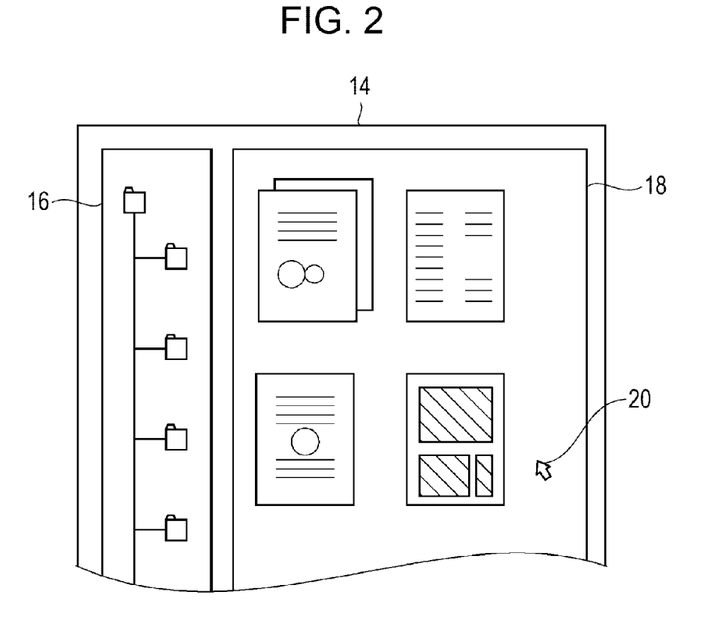
FIG. 2 is a diagram illustrating an exemplary screen.

FIG. 2 is a diagram illustrating an exemplary screen 14 displayed while the document management application programs are running. As illustrated in FIG. 2, the screen 14 includes a folder display area 16 in which folder images are displayed in a tree view, and a document display area 18 in which the thumbnail images of documents are displayed. A cursor 20 indicates a current position indicated by a user.

Figure 3:
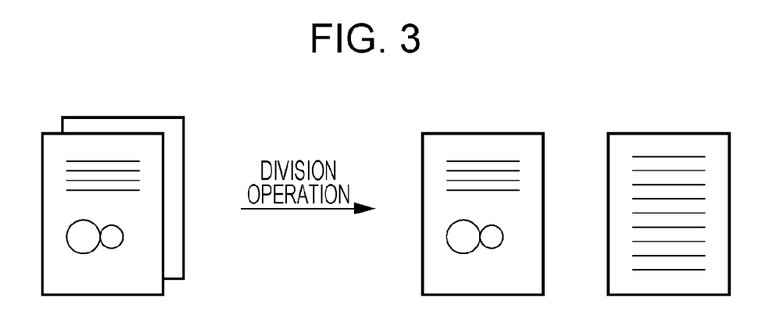
FIG. 3 is a diagram illustrating an exemplary state in which a document is divided.
Figure 4:
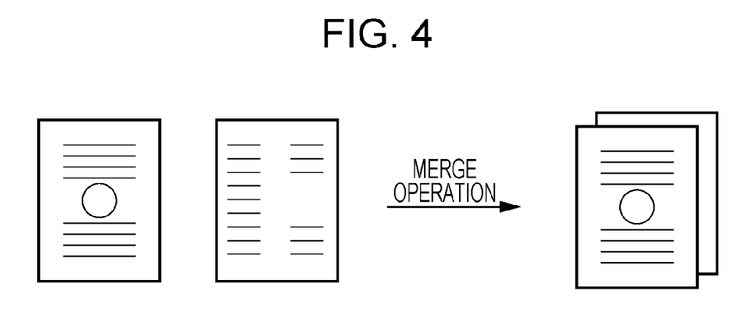
FIG. 4 is a diagram illustrating an exemplary state in which documents are merged with each other.

In the normal mode, a user uses the screen 14 as an interface to manage documents. For example, after selecting a document, a user double-clicks on the document, thereby dividing the selected document into multiple documents. FIG. 3 illustrates an exemplary state in which the document located on the upper left side in FIG. 2 is divided. In addition, for example, a user drags a selected document and drops the document in a target document and its surroundings, thereby merging the selected document with the target document. FIG. 4 illustrates an exemplary state in which the documents located on the lower left side and on the upper right side in FIG. 2 are merged with each other. In addition, for example, a user drags a selected document and drops the document in a folder and its surroundings, thereby storing the selected document into the folder to which dragging has been performed.

Thus, in the normal mode, document management, such as division of a document, merge of documents, and moving of a document into folder, is performed through various operations. Hereinafter, an operation of "selecting a document and then double-clicking on the document" is represented by a division operation; an operation of "dragging a selected document and then dropping the document in a target document and its surroundings" is represented by a merge operation; and an operation of "dragging a selected document and then dropping the document in a folder and its surroundings" is represented by a moving operation. A division operation, a merge operation, and a moving operation are generically called a document-related operation. Here, a division operation, a merge operation, and a moving operation are taken as examples of a document-related operation, but a document-related operation is not limited only to these.

Figure 5:
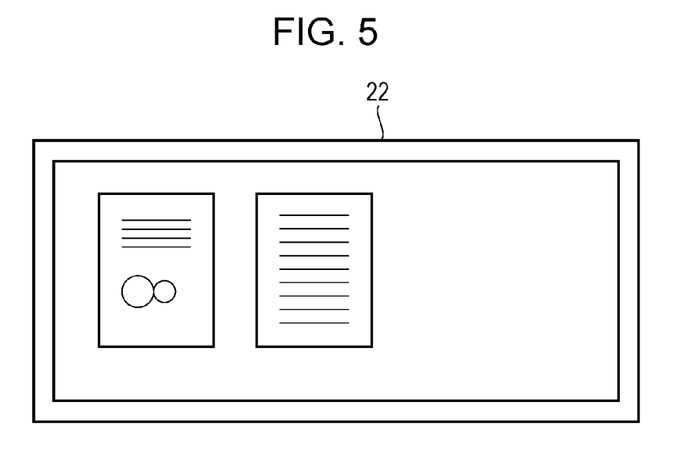
FIG. 5 is a diagram illustrating an exemplary retrieval result display screen.
Figure 6:
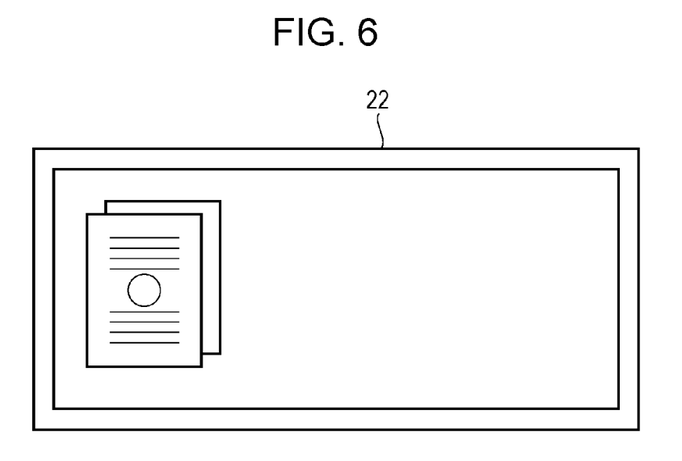
FIG. 6 is a diagram illustrating an exemplary retrieval result display screen.

In contrast, in the retrieval mode, a user performs a document-related operation not to manage documents but to retrieve documents. For example, in the retrieval mode, not only the screen 14 but also a retrieval result display screen 22 described below is displayed. When a user selects either one of documents displayed in the document display area 18 and performs a document-related operation, at least one document that was a target or a result of a document-related operation of the same type which was performed is retrieved, and the retrieved document is displayed as a retrieval result in the retrieval result display screen 22. For example, when a user selects either one of documents and performs a division operation, documents that were generated as the results of a division operation that was performed are retrieved, and the retrieved documents are displayed as retrieval results in the retrieval result display screen 22. FIG. 5 illustrates exemplary retrieval results obtained when a division operation is performed. In addition, for example, when a user selects either one of documents and performs a merge operation, a document that was generated as the result of a merge operation that was performed is retrieved, and the retrieved document is displayed as a retrieval result in the retrieval result display screen 22. FIG. 6 illustrates an exemplary retrieval result obtained when a merge operation is performed. In addition, for example, when a user selects either one of documents and performs a moving operation, a document that was a target of a moving operation that was performed, i.e., a document that was stored into a folder to which dragging has been performed through a moving operation that was performed, is retrieved, and the retrieved document is displayed as a retrieval result in the retrieval result display screen 22.

Thus, in the retrieval mode, a document-related operation itself is used as a retrieval key. Accordingly, a user may retrieve at least one document that was a target or a result of a document-related operation that was performed, by performing a document-related operation of the same type.

A technique for retrieving at least one document that was a target or a result of a document-related operation that was performed, by using a document-related operation of the same type itself as a retrieval key will be described below.

Figure 7:
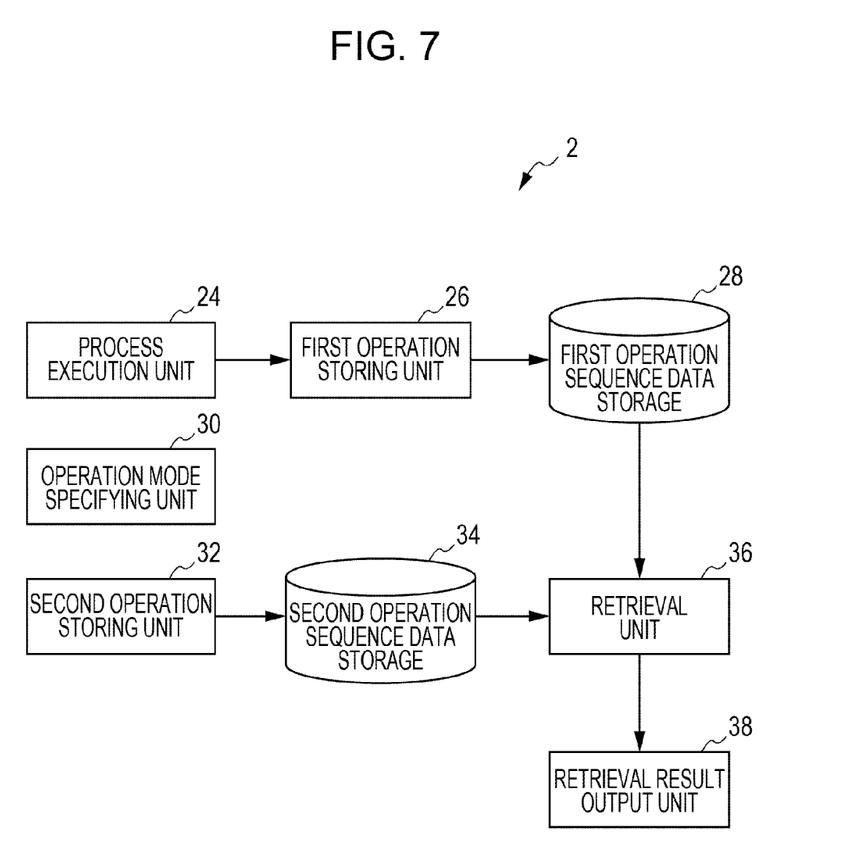
FIG. 7 is a functional block diagram illustrating exemplary functions achieved in the document management apparatus.

FIG. 7 is a functional block diagram illustrating functions achieved in the document management apparatus 2 by using the controller 4 to execute the document management application programs described above. As illustrated in FIG. 7, in the document management apparatus 2, a process execution unit 24, a first operation storing unit 26, a first operation sequence data storage 28, an operation mode specifying unit 30, a second operation storing unit 32, a second operation sequence data storage 34, a retrieval unit 36, and a retrieval result output unit 38 are achieved. The first operation sequence data storage 28 and the second operation sequence data storage 34 are achieved by using the hard disk 8. Functions other than the first operation sequence data storage 28 and the second operation sequence data storage 34 are achieved principally by using the controller 4.

Figure 8:
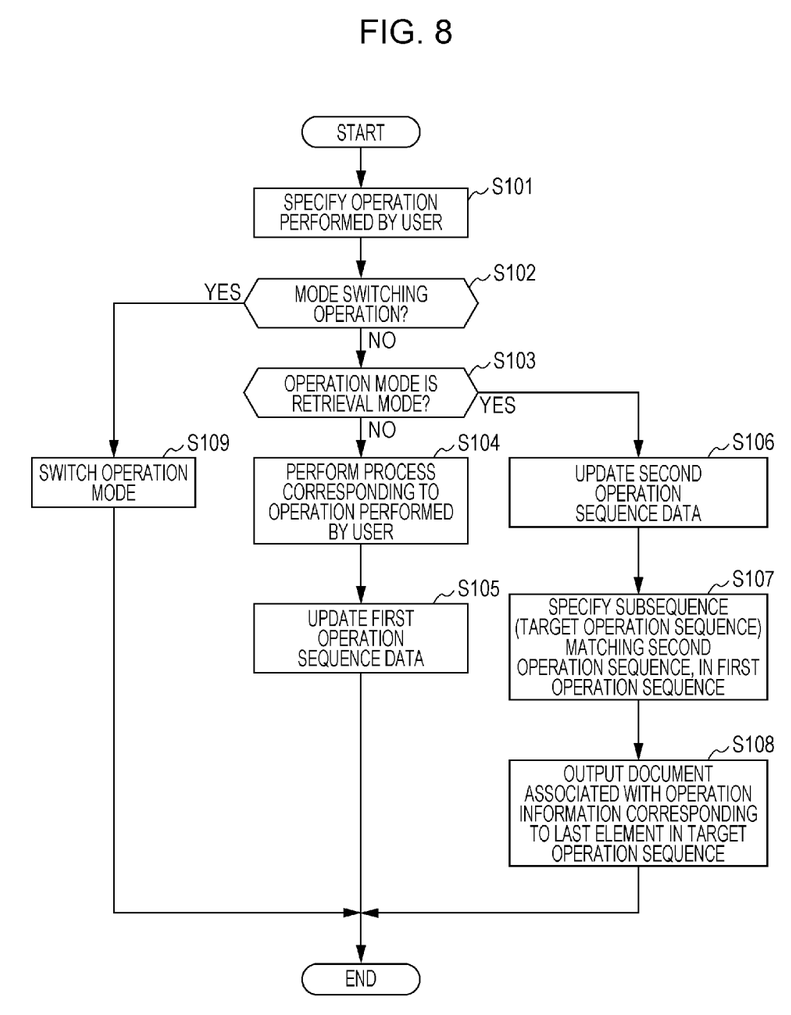
FIG. 8 is a flowchart of an exemplary process performed by a controller.

FIG. 8 is a diagram for describing a process performed by using the functions other than the first operation sequence data storage 28 and the second operation sequence data storage 34, and is a flowchart of an example of the process performed by the controller 4 in accordance with the document management application programs described above. In the present exemplary embodiment, this process is performed when a user performs some operation.

The controller 4 specifies the type of an operation performed by a user on the basis of an operation signal obtained from the operation input unit 10 (in step S101). Then, the controller 4 determines whether or not the operation performed by the user is a mode switching operation for switching the operation mode (in step S102).

If the operation performed by the user is not a mode switching operation (NO in step S102), the controller 4 determines whether or not the current operation mode is the retrieval mode, on the basis of the above-described flag stored in the main storage 6 (in step S103). If the current operation mode is the normal mode (NO in step S103), the process execution unit 24 (i.e., a processor) performs a process corresponding to the operation performed by the user (in step S104).

For example, if the operation performed by the user is a division operation, the process execution unit 24 divides a document selected by the user into multiple documents in step S104. For example, if the operation performed by the user is a merge operation, the process execution unit 24 generates a merged document by merging the document selected by the user with another document in step S104. For example, if the operation performed by the user is a moving operation, the process execution unit 24 stores the document selected by the user into a folder to which dragging has been performed, in step S104.

Then, the first operation storing unit 26 (i.e., a storing section) updates first operation sequence data stored in the first operation sequence data storage 28 on the basis of operation information identifying the operation performed by the user (in step S105). Specifically, the first operation sequence data includes at least one piece of operation information, and the first operation storing unit 26 appends the operation information identifying the operation performed by the user, to the first operation sequence data.

In step S105, the first operation storing unit 26 obtains the current time, and also associates the obtained current time used as execution time with operation information to be appended to the first operation sequence data. If the operation performed by the user is a division operation, the first operation storing unit 26 also associates identification information of each of documents which is generated in step S104 and which is used as an associated document, with operation information to be appended to the first operation sequence data, in step S105. If the operation performed by the user is a merge operation, the first operation storing unit 26 also associates identification information of the merged document that is generated in step S104 and that is used as an associated document, with operation information to be appended to the first operation sequence data, in step S105. If the operation performed by the user is a moving operation, the first operation storing unit 26 also associates identification information of the document that is stored into a folder and that is used as an associated document, with operation information to be appended to the first operation sequence data, in step S105.

Figure 9:
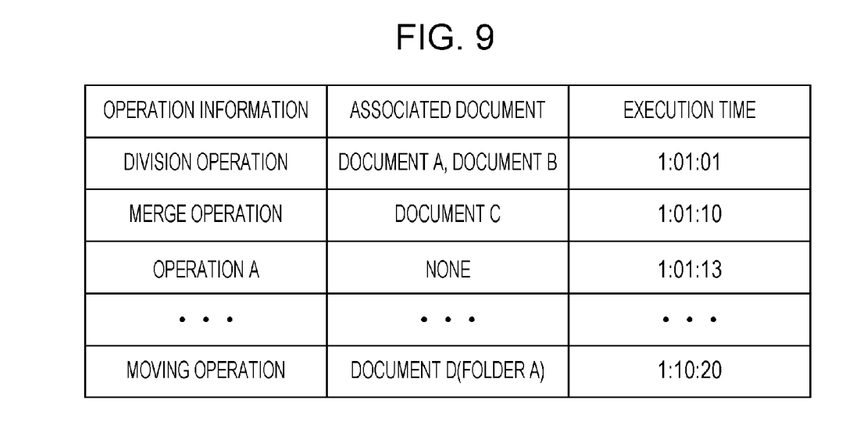
FIG. 9 is a diagram illustrating exemplary first operation sequence data.

FIG. 9 illustrates exemplary first operation sequence data. Pieces of operation information in the first operation sequence data are sequenced on the basis of the execution time. Thus, in the first operation sequence data, an element sequence (hereinafter, designated as a first operation sequence) whose elements are pieces of operation information in the first operation sequence data is illustrated. In other words, in the first operation sequence, an operation sequence containing operations that were performed by the user is illustrated. As a result, a new piece of operation information is appended to the first operation sequence in step S105. In FIG. 9, information described in parentheses indicates a folder to which dragging has been performed.

If the current operation mode is the retrieval mode, (YES in step S103), unlike the case in which the current operation mode is the normal mode, the process execution unit 24 does not perform a process corresponding to the operation performed by the user. That is, the operation performed by the user is canceled. For example, even when a merge operation or a moving operation is performed, merge of documents or storing of a document into a folder is not performed, and the thumbnail image of the dragged document returns back to its original position. In addition, for example, even when a division operation is performed, a document selected by the user is not divided.

That is, if the current operation mode is the retrieval mode (YES in step S103), the process execution unit 24 does not perform a process corresponding to the operation performed by the user, and the processes in steps S106 to S108 are instead performed. That is, the second operation storing unit 32 (i.e., a retrieval section or a setting section) updates second operation sequence data stored in the second operation sequence data storage 34 (in step S106). Specifically, the second operation sequence data includes at least one piece of operation information that is sequenced, and the second operation storing unit 32 appends operation information for identifying the operation performed by the user, to the second operation sequence data.

Figure 10:
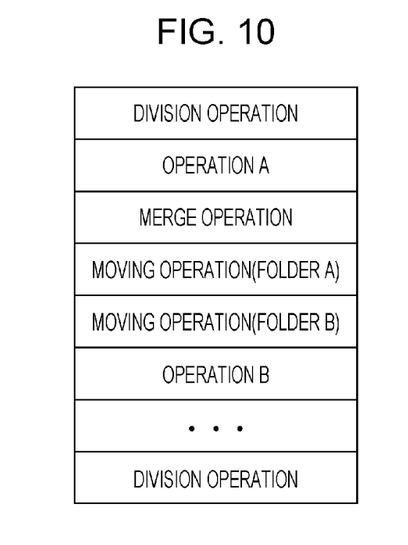
FIG. 10 is a diagram illustrating exemplary second operation sequence data.

FIG. 10 illustrates exemplary second operation sequence data. As described above, pieces of operation information in the second operation sequence data are sequenced. Thus, in the second operation sequence data, an element sequence (hereinafter, designated as a second operation sequence) whose elements are pieces of operation information in the second operation sequence data is illustrated. As a result, a new piece of operation information is appended to the second operation sequence in step S106.

Then, the retrieval unit 36 (i.e., the retrieval section) specifies elements (hereinafter, designated as a target operation sequence) which are in the first operation sequence and which match the second operation sequence (in step S107). The retrieval unit 36 (i.e., the retrieval section) obtains identification information of at least one associated document associated with the operation information that is the last element in the target operation sequence, and the retrieval result output unit 38 outputs the thumbnail image of the associated document identified through the obtained identification information as a retrieval result on the retrieval result output screen 22 (in step S108).

If the operation performed by the user is a mode switching operation (YES in step S102), the operation mode specifying unit 30 (i.e., a switching section) updates the above-described flag so as to switch the operation mode (in step S109). When the operation mode is switched from the retrieval mode to the normal mode, the operation mode specifying unit 30 also initializes the second operation sequence data in step S109.

As described above, the document management apparatus 2 uses a document-related operation itself as a retrieval key, and retrieves at least one document that was a target or a result of a document-related operation of the same type which was performed. Thus, a user may retrieve at least one document which was a target or a result of a document-related operation that was performed, by performing a document-related operation of the same type.

In addition, a user may narrow retrieval results by performing multiple document-related operations continuously. For example, in the case where three merge operations have been performed on different pairs of documents in the normal mode, when a merge operation is first performed in the retrieval mode, three documents that have been merged and that correspond to the three respective merge operations are output on the retrieval result output screen 22 as retrieval results. Subsequently, when the user moves a document that has been merged into a folder A in the retrieval mode without switching the operation mode, only a document that was a result obtained through a merge operation performed in the normal mode and that was moved into the folder A in the subsequent operation is output on the retrieval result output screen 22 as a retrieval result. Therefore, it is desirable that associated document information be stored as the second operation sequence data, in addition to the operation information. In this case, it is desirable that the retrieval unit 36 specify matched elements under the condition that an operation sequence matches another and that a group of multiple document-related operations having an identical first associated document matches another having an identical second associated document that may be the same as or different from the first identical associated document.

An exemplary embodiment of the present invention is not limited to the above-described exemplary embodiment.

For example, a retrieval result may be output without using the retrieval result output screen 22. For example, in the case where a retrieved document is displayed in the document display area 18, the document may be highlighted and displayed. For example, a predetermined mark, e.g., an asterisk, may be displayed on the upper right side of the thumbnail image of a retrieved document. In addition, for example, in the case where a retrieved document is stored in a folder displayed in the folder display area 16, the folder storing the document may be highlighted and displayed. For example, the above-described mark may be displayed on the right side of the image of the folder storing the retrieved document.

For example, a document-related operation is not limited to an operation using dragging, dropping or double-clicking as indicated in the above-described exemplary embodiment, and may be, for example, an operation of selecting a menu on a screen, an operation of clicking a button on a screen, or a key operation from a keyboard.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document retrieval apparatus comprising:
a switching section configured to switch an operation mode between a first mode and a second mode;
a hardware processor configured to, in a case where the operation mode is the first mode and a document-related operation is performed, perform a process corresponding to the performed document-related operation;

a storing section configured to, in a case where the operation mode is the first mode and the document-related operation is performed, store information and a document into a memory so as to associate the information with the document, the information indicating the performed document-related operation, the document being a target or a result of the process, which corresponds to the document-related operation and is performed by the hardware processor; and a retrieval section configured to, in a case where the operation mode is the second mode and the document-related operation is performed, not perform the process corresponding to the performed document-related operation, and retrieve the document, which was the target or the result of the process performed when the operation mode was the first mode, on the basis of data stored in the memory, wherein the document-related operation includes at least one of a merge operation that merges documents together, a division operation that divides a document into more than one document, and a moving operation that moves the location of a document.

2. The document retrieval apparatus according to claim 1, wherein, in the case where the operation mode is the first mode and the document-related operation is performed, the storing section stores the information indicating the performed document-related operation, as an element in a first element sequence including at least one element, in the memory, and wherein the retrieval section includes:

a setting section configured to, in the case where the operation mode is the second mode and the document-related operation is performed, set information indicating the performed document-related operation, as an element in a second element sequence including at least one element; and a section configured to, in the case where the operation mode is the second mode and the document-related operation is performed, specify an element sequence which is at least a subsequence of the first element sequence and which matches the second element sequence, and obtain a document associated with at least one element of the specified element sequence.

3. The document retrieval apparatus according to claim 1, wherein the document-related operation changes at least one of a feature and a location of the document.

4. The document retrieval apparatus according to claim 1, wherein the document-related operation is performed on the document.

5. The document retrieval apparatus according to claim 1, wherein each of the plurality of document-related operations is associated with a different process that is performed by the hardware processor.

6. The document retrieval apparatus according to claim 1, wherein in response to the current operation mode being the second mode and the merge operation being performed, the documents are not merged, in response to the current operation mode being the second mode and the moving operation being performed, a document is not stored into a folder, and in response to the current operation mode being the second mode and the division operation being performed, a selected document is not divided.

7. A non-transitory computer readable medium storing a program causing a computer to execute a process for retrieving a document, the process comprising:

switching an operation mode between a first mode and a second mode;

in a case where the operation mode is the first mode and a document-related operation of is performed, performing a process corresponding to the performed document-related operation;

in a case where the operation mode is the first mode and the document-related operation is performed, storing information and a document into a memory so as to associate the information with the document, the information indicating the performed document-related operation, the document being a target or a result of the process, which corresponds to the document-related operation; and in a case where the operation mode is the second mode and the document-related operation is performed, without performing the process corresponding to the performed document-related operation, retrieving the document, which was the target the result of the process performed when the operation mode was the first mode, on the basis of data stored in the memory, the document-related operation includes at least one of a merge operation that merges documents together, a division operation that divides a document into more than one document, and a moving operation that moves the location of a document.

8. The non-transitory computer readable medium according to claim 7, wherein the document-related operation includes a manipulation of the document.

9. The non-transitory computer readable medium according to claim 7, wherein the document-related operation changes at least one of a feature and a location of the document.

10. The non-transitory computer readable medium according to claim 7, wherein the document-related operation is performed on the document.

11. The non-transitory computer readable medium according to claim 7, wherein each of the plurality of document-related operations is associated with a different process that is performed by the hardware processor.

12. The non-transitory computer readable medium according to claim 7, wherein in response to the current operation mode being the second mode and the merge operation being performed, the documents are not merged, in response to the current operation mode being the second mode and the moving operation being performed, a document is not stored into a folder, and in response to the current operation mode being the second mode and the division operation being performed, a selected document is not divided.

13. A document retrieval method utilizing a hardware processor, the method comprising:

switching an operation mode between a first mode and a second mode;

in the case where the operation mode is the first mode and a document-related operation is performed, performing a process corresponding to the performed document-related operation;

in a case where the operation mode is the first mode and the document-related operation is performed, storing information and a document into a memory so as to associate the information with the document, the information indicating the performed document-related operation, the document being a target or a result of the process, which corresponds to the document-related operation and is performed by the hardware processor; and in a case where the operation mode is the second mode and the document-related operation is performed, without performing the process corresponding to the performed document-related operation, retrieving the document, which was the target or the result of the process which was performed when the operation mode was the first mode, on the basis of data stored in the memory, wherein the document-related operation includes at least one of a merge operation that merges documents together, a division operation that divides a document into more than one document, and a moving operation that moves the location of a document.

14. The document retrieval method according to claim 13, wherein in response to the current operation mode being the second mode and the merge operation being performed, documents are not merged, in response to the current operation mode being the second mode and the moving operation being performed, a document is not stored into a folder, and in response to the current operation mode being the second mode and the division operation being performed, a selected document is not divided.

15. The document retrieval method according to claim 13, wherein the document-related operation includes a manipulation of the document.

16. The document retrieval method according to claim 13, wherein the document-related operation changes at least one of a feature and a location of the document.

17. The document retrieval method according to claim 13, wherein the document-related operation is performed on the document.

18. The document retrieval method according to claim 13, wherein each of the plurality of document-related operations is associated with a different process that is performed by the hardware processor.

* * * * *